(12) United States Patent
Son et al.

(10) Patent No.: US 9,735,580 B2
(45) Date of Patent: Aug. 15, 2017

(54) HIGH VOLTAGE DIRECT CURRENT TRANSMISSION SYSTEM AND CONTROL METHOD THEREOF

(71) Applicant: LSIS CO., LTD., Anyang-si, Gyeonggi-do (KR)

(72) Inventors: Gum Tae Son, Seoul (KR); Ho Hwan Park, Suwon-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/696,197

(22) Filed: Apr. 24, 2015

(65) Prior Publication Data

US 2015/0333648 A1    Nov. 19, 2015

(30) Foreign Application Priority Data

May 14, 2014   (KR) .................. 10-2014-0058029

(51) Int. Cl.
*H02M 7/75*       (2006.01)
*H02J 3/36*       (2006.01)
(Continued)

(52) U.S. Cl.
CPC ............. *H02J 3/36* (2013.01); *H02M 7/7575* (2013.01); *H02J 2003/365* (2013.01);
(Continued)

(58) Field of Classification Search
CPC ...... H02M 7/7575; H02M 5/40; H02M 5/458; H02M 5/4575; H02M 1/12
(Continued)

(56) References Cited

U.S. PATENT DOCUMENTS 5,677,852 A     10/1997  Juhlin
6,400,585 B2 *   6/2002  Jiang-Hafner ............ H02J 3/36
                                                        363/35
(Continued)

FOREIGN PATENT DOCUMENTS

CN     103119817     5/2013
CN     103259257     8/2013
(Continued)

OTHER PUBLICATIONS

Okba, et al., "Harmonics in HVDC Links, Part II—Effects and Reduction Techniques," IECON Industrial Electronics Society, IEEE, XP032280910, Oct. 2012, pp. 1328-1336.

(Continued)

*Primary Examiner* — Fred E Finch, III
*Assistant Examiner* — Rafael O De Leon Domenech
(74) *Attorney, Agent, or Firm* — Lee Hong Degerman Kang & Waimey

(57) ABSTRACT

A high voltage direct current (HVDC) transmission system is provided. The high voltage direct current (HVDC) transmission system includes a rectifier converting alternating current (AC) power into DC power; an inverter converting the DC power into the AC power; DC transmission lines W1 and W2 transmitting the DC power obtained from the rectifier through conversion to the inverter; a first active power measurement unit measuring first active power input to the rectifier; a second active power measurement unit measuring second active power output from the inverter; and a first control unit controlling the operations of the rectifier and the inverter based on the first active power measured and the second active power measured, wherein the first control unit senses oscillation generated in the HVDC transmission system and generates a control signal for damping the (Continued)

sensed oscillation to control one or more of the rectifier and the inverter.

8 Claims, 4 Drawing Sheets

(51) Int. Cl.
*H02M 7/757* (2006.01)
*H02M 5/40* (2006.01)
*H02M 5/458* (2006.01)
*H02M 1/12* (2006.01)

(52) U.S. Cl.
CPC ............... *H02M 1/12* (2013.01); *H02M 5/40* (2013.01); *H02M 5/458* (2013.01); *Y02E 60/60* (2013.01)

(58) Field of Classification Search
USPC .......................................................... 363/35
See application file for complete search history.

(56) References Cited

U.S. PATENT DOCUMENTS

| | | | |
|---|---|---|---|
| 2002/0008982 A1 | 1/2002 | Jiang-Hafner | |
| 2012/0200166 A1* | 8/2012 | Berggren | H02J 3/24 307/102 |
| 2013/0175871 A1* | 7/2013 | Knuppel | H02J 3/24 307/102 |

FOREIGN PATENT DOCUMENTS

| | | |
|---|---|---|
| JP | 56-3599 | 1/1981 |
| JP | 61-9168 | 1/1986 |
| JP | 62-203597 | 9/1987 |
| JP | 04-193030 | 7/1992 |
| JP | 8-265973 | 10/1996 |
| JP | 10-323047 | 12/1998 |
| JP | 2000-060003 | 2/2000 |
| JP | 2001-333533 | 11/2001 |
| JP | 2012-085500 | 4/2012 |
| KR | 10-1019683 | 3/2011 |
| WO | 2011/121049 | 10/2011 |
| WO | 2015/049005 | 4/2015 |

OTHER PUBLICATIONS

Jiang, et al., "Harmonic Cancellation of a Hybrid Converter," IEEE Transactions on Power Delivery, vol. 13, No. 4, XP011049590, Oct. 1998, pp. 1291-1296.
European Patent Office Application Serial No. 15165646.9, Search Report dated Oct. 20, 2015, 8 pages.
Korean Intellectual Property Office Application Serial No. 10-2014-0058029, Office Action dated Dec. 22, 2015, 5 pages.
Japan Patent Office Application Serial No. 2015-097048, Office Action dated May 31, 2016, 3 pages.
Korean Intellectual Property Office Application Serial No. 10-2016-0097479, Office Action dated Oct. 1, 2016, 8 pages.
State Intellectual Property Office of the People's Republic of China Application Serial No. 201510246273.9, Office Action dated Mar. 2, 2017, 7 pages.

* cited by examiner

HIGH VOLTAGE DIRECT CURRENT TRANSMISSION SYSTEM AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2014-0058029, filed on May 14, 2014, the contents of which are all hereby incorporated by reference herein in its entirety.

BACKGROUND

The present disclosure relates to a high voltage direct current (HVDC) transmission system, and more particularly, to an HVDC transmission system that may damp oscillation generated in the HVDC transmission system, and a control method thereof.

High voltage direct current (HVDC) transmission indicates a power transmission method of converting, by a transmission site, AC power produced at a power station into DC power to transmit the DC power and then re-converting, by a reception site, AC power into DC to supply AC power.

An HVDC system is applied to submarine cable power transmission, large-amount long-distance power transmission, interconnection between AC systems, etc. Also, the HVDC transmission system enables different frequency system interconnection and asynchronism interconnection.

The transmission site converts the AC power into the DC power. That is, since transmitting the AC power by using a submarine cable is significantly dangerous, the transmission site converts the AC power into the DC power to transmit the DC power to the reception site.

The HVDC transmission system may have mechanical, torsional oscillation according to the operation of a three-phase AC generator in the HVDC system.

When the low-frequency oscillation including the mechanical, torsional oscillation is maintained or amplified without disappearing in the HVDC, it may have a serious effect on the stability of a power system in the HVDC system.

Thus, there is a need to damp low-frequency oscillation generated in the HVDC transmission system.

SUMMARY

Embodiments provide a high voltage direct current (HVDC) transmission system that may sense the low-frequency oscillation in the HVDC system and damp the sensed low-frequency oscillation, and a control method thereof.

In one embodiment, a high voltage direct current (HVDC) transmission system includes a rectifier converting alternating current (AC) power into DC power; an inverter converting the DC power into the AC power; DC transmission lines W1 and W2 transmitting the DC power obtained from the rectifier through conversion to the inverter; a first active power measurement unit measuring first active power input to the rectifier; a second active power measurement unit measuring second active power output from the inverter; and a first control unit controlling the operations of the rectifier and the inverter based on the first active power measured and the second active power measured, wherein the first control unit senses oscillation generated in the HVDC transmission system and generates a control signal for damping the sensed oscillation to control one or more of the rectifier and the inverter.

The first control unit include: an oscillation sensing unit sensing oscillation generated in the HVDC transmission system; a damping control unit generating the control signal for damping the generated oscillation based on the sensed oscillation; and a signal output unit transmitting the generated control signal.

The damping control unit may include: a first damping control unit generating an active power control signal controlling active power in generating the control signal, and a second damping control unit generating a reactive power control signal controlling reactive power in generating the control signal.

The damping control unit may generate the control signal based one or more of the active power control signal and the reactive power control signal.

The first control unit may determine whether the frequency of the sensed oscillation is within a preset range, and generates the control signal for damping the sensed oscillation when as a result of determination, the frequency of the sensed oscillation is within the preset range.

The first active power measurement unit may measure an AC current and an AC voltage input to the rectifier to measure the first active power, and the second active power measurement unit measures an AC current and an AC voltage output from the inverter to measure the second active power.

The high voltage direct current (HVDC) transmission system may further include a second control unit receiving the second active power measured by the second active power measurement unit.

The high voltage direct current (HVDC) transmission system may further include: a first AC filter removing a harmonic current generated in the power conversion process of the rectifier, and a second AC filter removing the harmonic current generated in the power conversion process of the inverter.

Each of the rectifier and the inverter may include any one of a thyristor value and an insulated gate bipolar transistor (IGBT) valve.

The high voltage direct current (HVDC) transmission system may further may include: a first capacitor connected in parallel to the rectifier and smoothing a DC voltage output from the rectifier; and a second capacitor connected in parallel to the inverter and smoothing a DC voltage input to the inverter.

The details of one or more embodiments are set forth in the accompanying drawings and the description below. Other features will be apparent from the description and drawings, and from the claims.

DETAILED DESCRIPTION OF THE EMBODIMENTS

Figure 1:
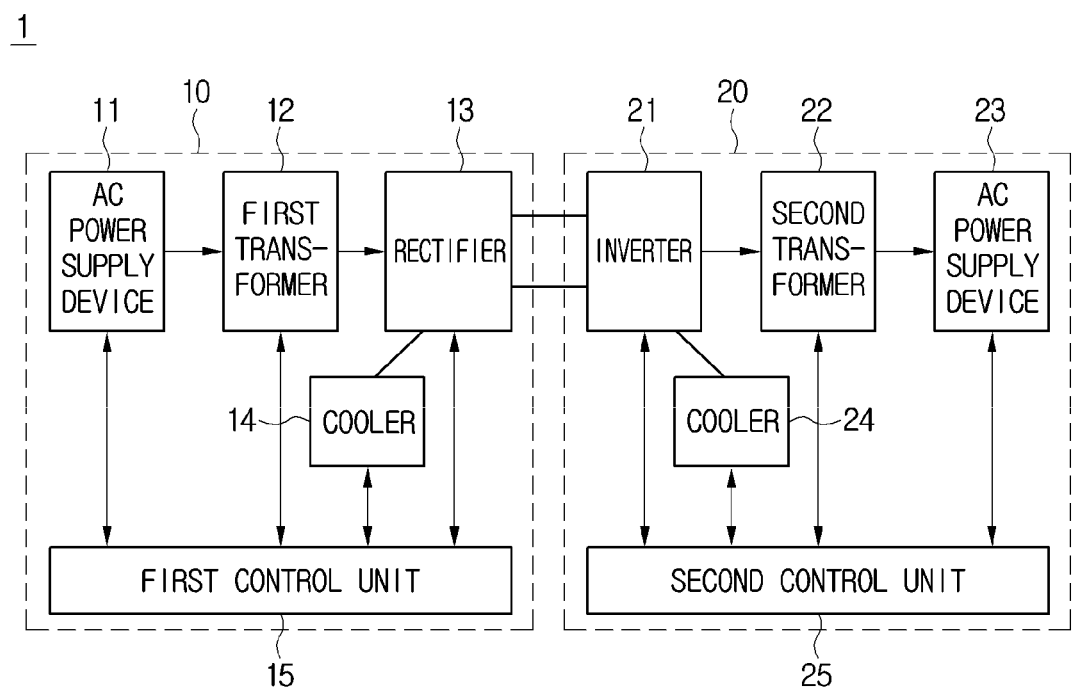
FIG. 1 is a diagram for explaining the configuration of a high voltage direct current (HVDC) transmission system according to an embodiment.

Some embodiments are described below in more detail with reference to the accompanying drawings. Since the suffixes "module" and "unit" for components used in the following description are given and interchanged for easiness in making the present disclosure, they do not have distinct meanings or functions.

The effects and features of the inventive concept, and implementation methods thereof will be clarified through following embodiments below described in detail with reference to the accompanying drawings. An embodiment may, however, be embodied in different forms and should not be construed as limited to the embodiments set forth herein. Rather, these embodiments are provided to make this disclosure thorough and complete and fully convey the scope of an embodiment to a person skilled in the art. Further, the inventive concept is only defined by scopes of claims. Like reference numerals throughout the disclosure refer to like components.

When describing embodiments, detailed descriptions related to known functions or configurations will be ruled out in order not to unnecessarily obscure subject matters of the embodiments. In addition, since the terms used herein are defined in consideration of functions in the embodiments, they may vary depending on a user's or operator's intention or practice. Therefore, their definitions need to be made based on details throughout the present disclosure.

Combinations of each block of the accompanying drawing and combinations of each step of a flowchart may also be performed by computer program instructions. Since the computer program instructions may be loaded on the processor of a general-purpose computer, a special-purpose computer or other programmable data processing equipment, the instructions performed by the processor of the computer or other programmable data processing equipment create a means that performs functions described on each block of a drawing or each step of a flowchart. Since the computer program instructions may also be stored in a computer usable or computer readable memory that may aim at the computer or other programmable data processing equipment in order to implement functions in a specific manner, the instructions stored in the computer usable or computer readable memory may also produce an item that includes an instruction means performing functions described on each block of a drawing or each step of a flowchart. The computer program instructions may also be loaded on the computer or other programmable data processing equipment. Thus, since a series of operation steps are performed on the computer or other programmable data processing equipment to create processes executed by a computer, instructions operating the computer or other programmable data processing equipment may also provide steps for performing functions described on each block of a drawing and each step of a flowchart.

Also, each block or each step may represent a portion of a module, a segment or a code that includes one or more executable instructions for performing specific logical function(s). Also, it should be noted that some alternatives may be performed in such a way that functions mentioned in blocks or steps are performed in a different order. For example, two blocks or steps shown one after another may also be performed substantially at the same time or the blocks or steps may also be sometimes performed in a reverse order according to a corresponding function.

FIG. 1 is a diagram for explaining the configuration of a high voltage direct current (HVDC) transmission system according to an embodiment.

An HVDC transmission system 1 according to an embodiment may be any one of a thyristor-based HVDC transmission system and a voltage-based HVDC system. The thyristor-based HVDC system may be a current-based HVDC transmission system using a thyristor valve as a rectifier, and the voltage-based HVDC transmission system may be a system using an insulated gate bipolar transistor (IGBT) device.

In the case of the thyristor-based HVDC system, a rotation device, such as a generator or synchronous compensator in order to rectify a thyristor valve is needed for an inverter-side system, and a capacitor bank for compensating for reactive power may be included in the rectifier or the inverter-side system.

Since the voltage-based HVDC system significantly decreases harmonics through fast switching, it is possible to decrease the size of a harmonic filter for removing the harmonics and there is no need to supply reactive power. Also, the voltage-based HVDC transmission system may independently control active power and reactive power.

Referring to FIG. 1, the HVDC transmission system 1 according to an embodiment includes a first power converter 10 and a second power converter 20.

The first power converter 10 includes an AC power supply device 11, a first transformer 12, a rectifier 13, a cooler 14, and a first control unit 15.

The AC power supply device 11 may produce AC power and transmit the AC power to the first transformer 12. In an embodiment, the AC power supply device 11 may be a power station that may produce and supply power, such as a wind power station.

The first transformer 12 may increase the size of the AC voltage of the AC power received from the AC power supply device 11 and convert it to AC power having a high voltage.

The rectifier 13 may convert HVAC power converted from the first transformer 12 into DC power.

The cooler 14 may cool heat emitting from the rectifier 13. In particular, the cooler 14 may cool heat emitting from the rectifier 13 and related parts, by circulating coolant.

The first control unit 15 may control the overall operations of the first power converter 10.

In particular, the first control unit 15 may control the size of AC power, the phase of AC power, active power and reactive power of any one terminal of the first power converter 10.

The first control unit 15 may sense oscillation generated in the HVDC transmission system 1, generate a control signal capable of damping low-frequency oscillation based on the sensed oscillation, and control the operation of the first power converter 10 based on the generated control signal.

The DC power converted through the rectifier 13 may be transmitted to the second power converter 20 through a DC line.

The second power converter 20 includes an inverter 21, a second transformer 22, an AC power supply device 23, a cooler 24, and a second control unit 25.

The inverter 21 converts the DC power received from the first power converter 10 through the DC line, into AC power.

The second transformer 22 converts the AC power obtained through conversion from the inverter 21, into low voltage AC power.

The AC power supply device 23 receives the low voltage AC power from the second transformer 22.

The cooler 24 may cool heat emitting from the inverter 21.

The second control unit 25 controls the overall components of the second converter 20.

In particular, the second control unit 25 may control the size of AC power, the phase of AC power, active power and reactive power of any one terminal of the first power converter 20.

Also, the second control unit 25 may sense oscillation generated in the HVDC transmission system 1, generate a control signal capable of damping low-frequency oscillation based on the sensed oscillation, and control the operation of the second power converter 20 based on the generated control signal.

Figure 2:
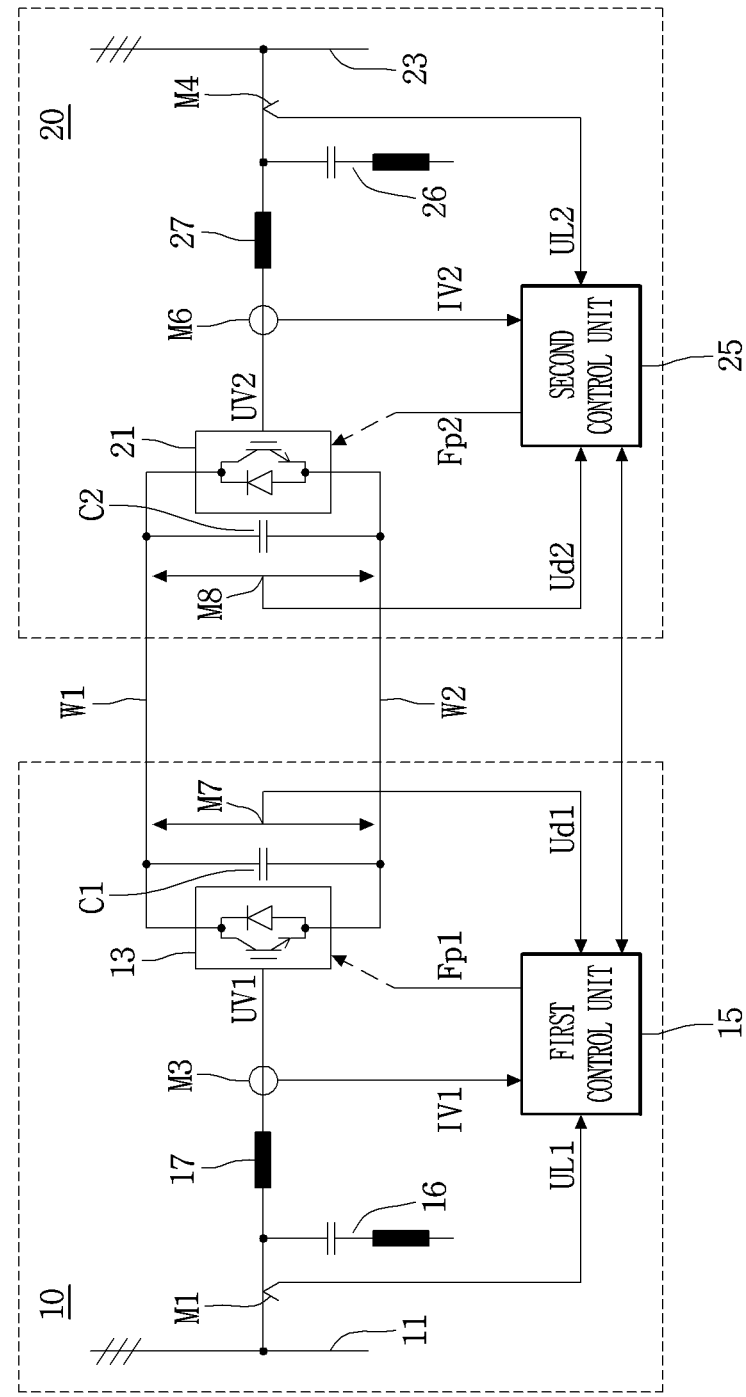
FIG. 2 is a diagram for explaining the actual configuration of an HVDC transmission system according to an embodiment.

FIG. 2 is a diagram for explaining the actual configuration of an HVDC transmission system according to an embodiment.

Referring to FIG. 2, the HVDC transmission system 1 according to an embodiment includes the first power converter 10 and the second power converter 20.

The first power converter 10 may convert AC power into DC power to provide the DC power to the second power converter 20, and the second power converter 20 may convert the DC power received from the first power converter 10 into AC power.

The first power converter 10 and the second power converter 20 may be connected by positive-pole DC transmission lines W1 and W2. The DC transmission lines W1 and W2 may transmit a DC current or a DC voltage output by the first power converter 10 to the second power converter 20.

The DC transmission lines W1 and W2 may be any one of an overhead line and a cable, or a combination thereof.

The first power converter 10 includes an AC power supply device 11, a first AC filter 16, a first inductor 17, a rectifier 13, a first capacitor C1, a first measurement unit M1, a second measurement unit M3, a third measurement unit M7, and a first control unit 15.

The AC power supply device 11 may produce AC power and transmit the AC power to the rectifier 13. The AC power supply device 11 may be a power station that may produce and supply power, such as a wind power station.

The AC power supply device 11 may transmit three-phase AC power to the rectifier 13.

The first AC filter 16 may be disposed between the AC power supply device 11 and the rectifier 13. The first AC filter 16 may remove current harmonics generated in the process of converting AC power into DC power by the rectifier 13. That is, the first AC filter 16 may remove the current harmonics to block the current harmonics from entering the AC power supply device 11. In an embodiment, the first AC filter 16 may include a resonant circuit including a capacitor, an inductor, and a resistor.

Also, the first AC filter 16 may also supply reactive power consumed in the rectifier 13.

The first inductor 17 may be disposed between the first AC filter 13 and the rectifier 13.

The first inductor 17 may transmit, to the rectifier 13, an AC current from which the current harmonics have been removed through the first AC filter 16.

The first inductor 17 may be an inductor that adjusts the phase of the AC current from which the current harmonics have been removed through the first AC filter 16.

The rectifier 13 may convert the AC power received from the AC power supply device 11, in particular, from the first inductor 17, into DC power.

The rectifier 13 may be a semiconductor valve that may convert AC power into DC power. In an embodiment, the semiconductor valve may be any one of a thyristor valve and an IGBT valve.

The first capacitor C1 may be a smoothing capacitor that is connected in parallel to the rectifier 13 and smoothes a DC voltage output from the rectifier 13.

The first measurement unit M1 may measure an AC voltage UL1 supplied by the AC power supply device 11 and transmit a measured voltage to the first control unit 15.

The first measurement unit M1 may measure an AC voltage UL1 of a point between the AC power supply device 11 and the first AC filter 16 and transmit a measured voltage to the first control unit 15. In the following, the AC voltage UL1 measured on the point between the AC power supply device 11 and the first AC filter 16 is referred to as a bus voltage UL1.

The second measurement unit M3 may measure an AC current IV1 or AC voltage UV1 input to the output of the first inductor 17 or to the rectifier 13 and transmit a measured current or voltage to the first control unit 15. In the following, the AC voltage UV1 input to the output of the first inductor 17 or to the rectifier 13 is referred as a bridge voltage UV1.

The third measurement unit M7 may measure a DC voltage Ud1 across the first capacitor C1 and transmit a measured voltage to the first control unit 15.

The first control unit 15 may control the overall operations of the first power converter 10.

The first control unit 15 may control the operations of the rectifier 13 based on the bus voltage UL1 received from the first measurement unit M1, the AC current IV1 received from the second measurement unit M3 and input to the rectifier 13, and the DC voltage Ud1 received from the third measurement unit M7 and across the first capacitor C1.

When the rectifier 13 is of an IGBT valve type, the first control unit 15 may transmit a turn-on signal or turn-off signal to the rectifier 13 based on the bus voltage UL1 received from the first measurement unit M1, the AC current IV1 received from the second measurement unit M3 and input to the rectifier 13, and the DC voltage Ud1 received from the third measurement unit M7 and across the first capacitor C1 to control the operations of the rectifier 13. The conversion from AC power into DC power may be controlled by the turn-on signal or turn-off signal.

Also, the first control unit 15 may generate a phase change command signal based on an abnormal voltage state on the DC transmission lines W1 and W2, and adjust the phase difference between the bridge voltage UV1 and the bus voltage UL1 according to the generated phase change command signal.

In particular, when a DC voltage (e.g., the DC voltage Ud1 across the first capacitor C1) measured at a point on the DC transmission line W1 exceeds a reference value for a certain time, the first control unit 15 may confirm that there is an abnormal voltage on the DC transmission line.

When it is confirmed that there is the abnormal voltage on the DC transmission line, the first control unit 15 may generate a phase change command signal and adjust the phase difference between the bridge voltage UV1 and the bus voltage UL1.

The first control unit 15 may adjust the phase difference between the bridge voltage UV1 and the bus voltage UL1 to adjust a DC voltage obtained through conversion from the rectifier 13, so it is possible to prevent a DC voltage on the DC transmission line from sharply increasing.

Also, the first control unit 15 may sense oscillation generated in the HVDC transmission system 1, generate a control signal capable of damping low-frequency oscillation based on the sensed oscillation, and control the operation of the first power converter 10 based on the generated control signal.

In particular, the operation of damping low-frequency oscillation of the first control unit 15 is described with reference to FIG. 3.

Figure 3:
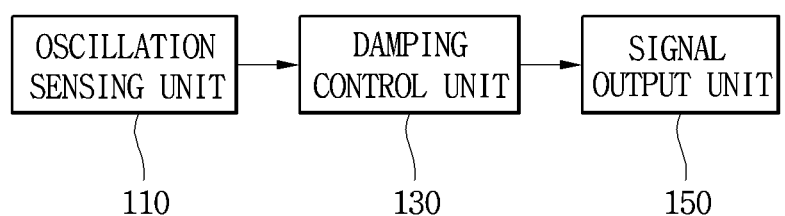
FIG. 3 is a block diagram of the control unit of an HVDC transmission system according to an embodiment.

Referring to FIG. 3, the first control unit 15 includes an oscillation sensing unit 10, a damping control unit 130, and a signal output unit 150.

The oscillation sensing unit 110 may sense oscillation generated in the HVDC transmission system 1.

Since the oscillation sensing unit 110 includes a sensor capable of sensing oscillation, it is possible to sense oscillation generated in the HVDC transmission system 1 and it is possible to measure the frequency of sensed oscillation.

The damping control unit 130 may generate a control signal capable of damping low-frequency oscillation based on the sensed oscillation.

In particular, the damping control unit 130 may determine whether the frequency of the sensed oscillation is within a preset range, and generate a control signal capable of damping low-frequency oscillation based on the sensed oscillation when as a result of determination, the frequency of the sensed oscillation is within the preset range.

In addition, the control signal may include an active power control signal controlling active power and a reactive power control signal controlling reactive power.

Figure 4:
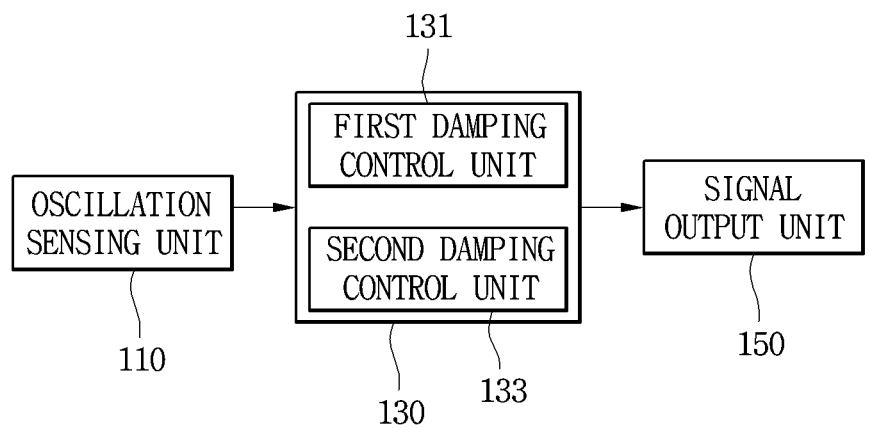
FIG. 4 is a block diagram of the control unit of an HVDC transmission system according to another embodiment.

Referring to FIG. 4, the damping control unit 130 may include a first damping control unit 131 and a second damping control unit 132.

The first damping control unit 131 may generate an active power control signal controlling active power in generating the control signal.

The second damping control unit 132 may generate a reactive power control signal controlling reactive power in generating the control signal.

Thus, since the damping control unit 130 may generate the active power control signal through the first damping control unit 131 and the reactive power control signal through the second damping control unit 132, it is possible to control the operation of the first power converter 10 based on one or more of the generated active power control signal and the generated reactive power control signal.

Refer back to FIG. 3.

The signal output unit 150 may transmit the generated control signal to each of associated devices.

In particular, the signal output unit 150 may transmit the control signal generated by the damping control unit 130 to one or more of associated devices including the AC power supply device 11, the first transformer 12, the rectifier 13, and the cooler 14 so that each device may operate.

Also, the signal output unit 150 may also convert the generated control signal to transmit a converted signal to each of associated devices.

For example, the signal output unit 150 may convert the control signal in order to be suitable for each of the associated devices including the AC power supply device 11, the first transformer 12, the rectifier 13 and the cooler 14, and transmit a converted signal to each device.

Refer back to FIG. 2.

The second power converter 20 includes an inverter 21, a second capacitor C2, a second inductor 27, a second AC filter 26, an AC power supply device 23, a fourth measurement unit M8, a fifth measurement unit M6, a sixth measurement unit M4, and a second control unit 25.

The inverter 21 may be a semiconductor valve that may convert DC power received from the rectifier 13, into AC power. In an embodiment, the semiconductor valve may be any one of a thyristor valve and an IGBT valve.

The inverter 21 may receive a DC current or a DC voltage from the inverter 21 through the DC transmission lines W1 and W2, and converter the received DC current or DC voltage into an AC current or an AC voltage.

The second capacitor C2 may be connected in parallel to the inverter 21, and may be a smoothing capacitor that smoothes the DC voltage input to the inverter 21.

The second inductor 27 may be disposed between the inverter 21 and the second AC filter 26. The second inductor 27 may transmit the AC current output from the inverter 21, to the AC power supply device 23. The second inductor 27 may be a phase inductor that adjusts the phase of an AC current.

The second AC filter 26 may be disposed between the second inductor 27 and the AC power supply device 23. The second AC filter 26 may remove current harmonics generated in the process of converting DC power into AC power by the inverter 21. That is, the second AC filter 26 may remove the current harmonics to block the current harmonics from entering the AC power supply device 23. In an embodiment, the second AC filter 26 may include a resonant circuit including a capacitor, an inductor, and a resistor.

Also, the second AC filter 26 may also supply reactive power consumed in the inverter 21.

The AC power supply device 23 may receive, through the second AC filter 26, AC power from which the harmonics have been removed.

The fourth measurement unit M8 may measure a DC voltage Ud2 across the second capacitor C2 and transmit a measured voltage to the second control unit 25.

The fifth measurement unit M6 may measure an AC current IV2 or AC voltage UV2 output from the input of the second inductor 27 or from the inverter 21 and transmit a measured current or voltage to the second control unit 25. In the following, the AC voltage UV2 output from the output of the second inductor 27 or from the inverter 21 is referred as a bridge voltage UV2.

The sixth measurement unit M4 may measure an AC voltage UL2 supplied by the AC power supply device 23 and transmit a measured voltage to the second control unit 25. The sixth measurement unit M4 may measure the AC voltage UL2 of a point between the AC power supply device 23 and the second AC filter 26 and transmit a measured voltage to the second control unit 25. In the following, the AC voltage UL2 measured on the point between the AC power supply device 23 and the second AC filter 26 is referred to as a bus voltage UL2.

The second control unit 25 may control the overall operations of the second power converter 20.

The second control unit 25 may control the operations of the inverter 21 based on the bus voltage UL2 received from the sixth measurement unit M4, the AC current IV2 received from the fifth measurement unit M6 and output from the inverter 21, and the DC voltage Ud2 received from the sixth measurement unit M4 and across the second capacitor C2.

If the inverter 21 is of an IGBT valve type, the second control unit 25 may transmit a turn-on signal or turn-off signal to the inverter 21 based on the bus voltage UL2 received from the sixth measurement unit M4, the AC current IV2 received from the fifth measurement unit M6 and output from the inverter 21, and the DC voltage Ud2 received from the fourth measurement unit M8 and across the second capacitor C2 to control the operations of the inverter 21. The conversion from DC power into AC power may be controlled by the turn-on signal or turn-off signal.

Also, the second control unit 25 may generate a phase change command signal based on an abnormal voltage state on the DC transmission lines W1 and W2, and adjust the phase difference between the bridge voltage UV2 and the bus voltage UL2 according to the generated phase change command signal.

In particular, when a DC voltage (e.g., the DC voltage Ud2 across the second capacitor C2) measured at a point on the DC transmission line W1 exceeds a reference value for a certain time, the second control unit 25 may confirm that there is an abnormal voltage on the DC transmission line. When it is confirmed that there is the abnormal voltage on the DC transmission line, the second control unit 25 may generate a phase change command signal and adjust the phase difference between the bridge voltage UV2 and the bus voltage UL2.

Also, the second control unit 25 may sense oscillation generated in the HVDC transmission system 1, generate a control signal capable of damping low-frequency oscillation based on the sensed oscillation, and control the operation of the second power converter 20 based on the generated control signal.

In particular, the operation of damping low-frequency oscillation of the second control unit 25 is described with reference to FIG. 3.

Referring to FIG. 3, the second control unit 25 includes an oscillation sensing unit 110, a damping control unit 130, and a signal output unit 150.

The oscillation sensing unit 110 may sense oscillation generated in the HVDC transmission system 1.

Since the oscillation sensing unit 110 includes a sensor capable of sensing oscillation, it is possible to sense oscillation generated in the HVDC transmission system 1 and it is possible to measure the frequency of sensed oscillation.

The damping control unit 130 may generate a control signal capable of damping low-frequency oscillation based on the sensed oscillation.

In particular, the damping control unit 130 may determine whether the frequency of the sensed oscillation is within a preset range, and generate a control signal capable of damping low-frequency oscillation based on the sensed oscillation when as a result of determination, the frequency of the sensed oscillation is within the preset range.

In addition, the control signal may include an active power control signal controlling active power and a reactive power control signal controlling reactive power.

Referring to FIG. 4, the damping control unit 130 may include a first damping control unit 131 and a second damping control unit 132.

The first damping control unit 131 may generate an active power control signal controlling active power in generating the control signal.

The second damping control unit 132 may generate a reactive power control signal controlling reactive power in generating the control signal.

Thus, since the damping control unit 130 may generate the active power control signal through the first damping control unit 131 and the reactive power control signal through the second damping control unit 132, it is possible to control the operation of the second power converter 20 based on one or more of the generated active power control signal and the generated reactive power control signal.

Refer back to FIG. 3.

The signal output unit 150 may transmit the generated control signal to each of associated devices.

In particular, the signal output unit 150 may transmit the control signal generated by the damping control unit 130 to one or more of associated devices including the AC power supply device 23, the first transformer 23, the rectifier 21, and the cooler 24 so that each device may operate.

Also, the signal output unit 150 may also convert the generated control signal to transmit a converted signal to each device.

For example, the signal output unit 150 may convert the control signal in order to be suitable for each of the associated devices including the AC power supply device 23, the second transformer 22, the inverter 21 and the cooler 24, and transmit a converted signal to each device.

The operation method of an HVDC transmission system according to an embodiment is described with reference to FIG. 5.

Figure 5:
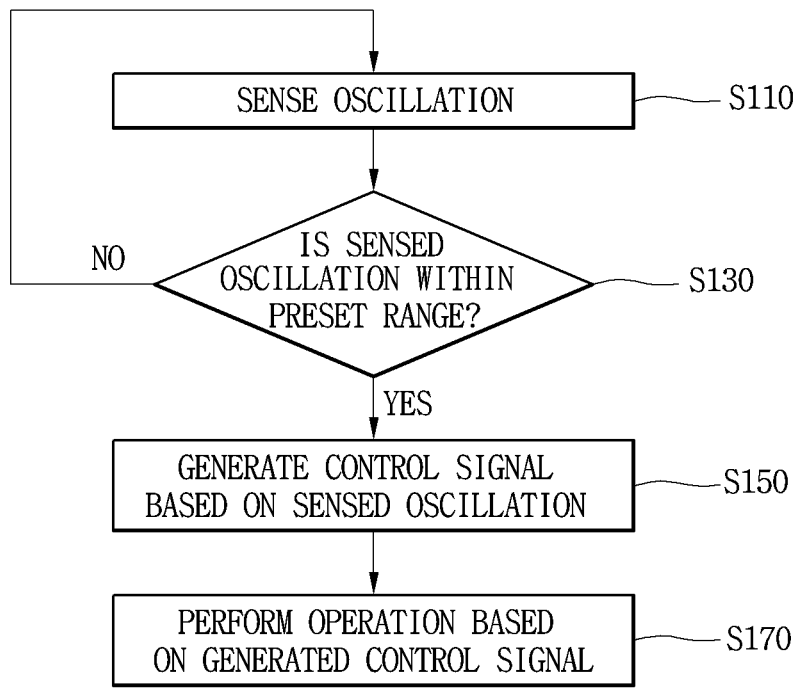
FIG. 5 is a flowchart of a control method of an HVDC transmission system according to an embodiment.

FIG. 5 is a flowchart of a control method of an HVDC transmission system according to an embodiment.

In the following, the control method of the HVDC transmission system according to an embodiment is described in conjunctions with FIGS. 1 to 4.

Firstly, the control method of the first power converter 10 is described.

The oscillation sensing unit 110 of the first control unit 15 senses oscillation generated in the HVDC transmission system 1 in step S110.

The oscillation sensing unit 110 may sense oscillation generated in the HVDC transmission system 1 and measure the frequency of the sensed oscillation.

For example, the oscillation sensing unit 110 may sense mechanical, torsional oscillation generated in an AC generator in the AC power supply device 11.

The oscillation sensing unit 110 may transmit information on the sensed oscillation to the damping control unit 130.

The damping control unit 130 of the first control unit 15 determines whether the sensed oscillation is within a preset range in step S130.

The damping control unit 130 may determine whether the frequency of the sensed oscillation is within a preset range.

For example, when the frequency of the sensed oscillation is within a preset range of about 0.1 Hz to about 2.0 Hz, the damping control unit 130 may determine that the sensed oscillation is low-frequency oscillation. In this example, the preset range from about 0.1 Hz to about 2.0 Hz is provided for description and a preset range may be set variously according to a user's or designer's choice.

The damping control unit 130 of the first control unit 15 generates a control signal based on the sensed oscillation, when the sensed oscillation is within the preset range in step S150. The damping control unit 130 may generate a control signal capable of damping low-frequency oscillation based on the sensed oscillation, when as a result of determination in step S130, the sensed oscillation is within the preset range.

In particular, the damping control unit 130 may generate one or more of an active power control signal and a reactive power control signal capable of damping low-frequency oscillation based on the sensed oscillation.

Thus, the first damping control unit 131 may generate the active power control signal controlling active power based on the sensed oscillation, and the second damping control unit 132 may generate the reactive power control signal controlling reactive power based on the sensed oscillation.

The control signal generated by the damping control unit 130 may be transmitted to the signal output unit 150.

The signal output unit 150 of the first control unit 15 operates associated devices based on the generated control signal in step S170.

The signal output unit 150 may transmit the generated control signal to one or more of associated devices including the AC power supply device 11, the first transformer 12, the rectifier 13, and the cooler 14 so that each device may operate.

For example, the signal output unit 150 may convert the control signal in order to be suitable for each of the associated devices including the AC power supply device 11, the first transformer 12, the rectifier 13 and the cooler 14, and transmit a converted signal to each device.

Thus, each of the devices receiving the control signal may operate based on the control signal capable of damping low-frequency oscillation.

Therefore, it is possible to damp low-frequency oscillation generated in the HVDC transmission system 1.

Subsequently, the control method of the second power converter 20 is described.

The oscillation sensing unit 110 of the second control unit 25 senses oscillation generated in the HVDC transmission system 1 in step S110.

The oscillation sensing unit 110 may sense oscillation generated in the HVDC transmission system 1 and measure the frequency of the sensed oscillation.

For example, the oscillation sensing unit 110 may sense mechanical, torsional oscillation generated in an AC generator in the AC power supply device 23.

The oscillation sensing unit 110 may transmit information on the sensed oscillation to the damping control unit 130.

The damping control unit 130 of the second control unit 25 determines whether the sensed oscillation is within a preset range in step S130.

The damping control unit 130 may determine whether the frequency of the sensed oscillation is within the preset range.

For example, when the frequency of the sensed oscillation is within a preset range of about 0.1 Hz to about 2.0 Hz, the damping control unit 130 may determine that the sensed oscillation is low-frequency oscillation. In this example, the preset range from about 0.1 Hz to about 2.0 Hz is provided for description and a preset range may be set variously according to a user's or designer's choice.

The damping control unit 130 of the second control unit 25 generates a control signal based on the sensed oscillation, when the sensed oscillation is within the preset range in step S150.

The damping control unit 130 may generate a control signal capable of damping low-frequency oscillation based on the sensed oscillation, when as a result of determination in step S130, the sensed oscillation is within the preset range.

In particular, the damping control unit 130 may generate one or more of an active power control signal and a reactive power control signal capable of damping low-frequency oscillation based on the sensed oscillation.

Thus, the first damping control unit 131 may generate the active power control signal controlling active power based on the sensed oscillation, and the second damping control unit 132 may generate the reactive power control signal controlling reactive power based on the sensed oscillation.

The control signal generated by the damping control unit 130 may be transmitted to the signal output unit 150.

The signal output unit 150 of the second control unit 25 operates associated devices based on the generated control signal in step S170.

The signal output unit 150 may transmit the generated control signal to one or more of associated devices including the AC power supply device 11, the first transformer 12, the rectifier 13, and the cooler 14 so that each device may operate.

For example, the signal output unit 150 may convert the control signal in order to be suitable for each of the associated devices including the AC power supply device 23, the second transformer 22, the inverter 21 and the cooler 24, and transmit a converted signal to each device.

Thus, each of the devices receiving the control signal may operate based on the control signal capable of damping low-frequency oscillation.

Therefore, it is possible to damp low-frequency oscillation generated in the HVDC transmission system 1.

According to the control method of the HVDC transmission system according to embodiments, it is possible to damp low-frequency oscillation generated in the HVDC transmission system 1.

According to embodiments, since it is possible to damp low-frequency oscillation based on a reactive power control signal, an active power transmission operation may not be obstructed.

According to an embodiment, the above-described method may also be embodied as processor readable codes on a program-recorded medium. Examples of the processor readable medium are a ROM, a RAM, a CD-ROM, a magnetic tape, a floppy disk, an optical data storage device, and a carrier wave form (such as data transmission through the Internet).

The above-described embodiments are not limited to the above-described configuration and method, and some or all of the embodiments may also be selectively combined so that various variations may be implemented.

Also, although exemplary embodiments have been illustrated and described above, the inventive concept is not limited to specific embodiments described above but may be varied by a person skilled in the art without departing from the subject matter of the inventive concept claimed in the following claims and the variations should not be understood separately from the technical spirit or perspective of the inventive concept.

What is claimed is:

1. A high voltage direct current (HVDC) transmission system comprising:
   a first power converter comprising a first control unit and one or more first devices, one of the one or more first devices including a first AC power supply device, a first transformer, a rectifier and a first cooler and the rectifier configured to convert alternating current (AC) power into DC power;
   a second power converter comprising a second control unit and one or more second devices, one of the one or more second devices including an inverter, a second transformer, a second AC power supply device and a second cooler, the inverter configured to convert the DC power into the AC power;
   DC transmission lines configured to transmit the DC power obtained from the rectifier through conversion to the inverter;
   a first active power measurement unit configured to measure first active power input to the rectifier; and
   a second active power measurement unit configured to measure second active power output from the inverter, wherein the first control unit comprises:
an first oscillation sensing unit configured to sense mechanical torsional oscillation generated in the one or more first devices included in the first power converter to measure a frequency of the generated mechanical torsional oscillation;
a first damping control unit configured to determine whether the measured frequency of the mechanical torsional oscillation is within a preset range and generate a control signal for damping low-frequency mechanical torsional oscillation when the frequency of the sensed mechanical torsional oscillation is within a preset range; and
a first signal output unit configured to convert the generated control signal in order to be suitable for each of the one or more first devices to transmit the converted signal to the one or more first devices such that each first device operates to damp the low-frequency mechanical torsional oscillation of the one or more first devices,
wherein the second control unit comprises:
an second oscillation sensing unit configured to sense mechanical torsional oscillation generated in the one or more first devices included in the second power converter to measure a frequency of the generated mechanical torsional oscillation;
a second damping control unit configured to determine whether the measured frequency of the mechanical torsional oscillation is within a preset range and generate a control signal for damping low-frequency mechanical torsional oscillation when the frequency of the sensed mechanical torsional oscillation is within a preset range; and
a second signal output unit configured to convert the generated control signal in order to be suitable for each of the one or more second devices to transmit the converted signal to the one or more second devices such that each second device operates to damp the low-frequency mechanical torsional oscillation of the one or more second devices.

2. The high voltage direct current (HVDC) transmission system according to claim 1, wherein the first damping control unit is further configured to generate an active power control signal controlling active power in generating the control signal, and
the second damping control unit is further configured to generate a reactive power control signal controlling reactive power in generating the control signal.

3. The high voltage direct current (HVDC) transmission system according to claim 2, wherein the first damping control unit and the second damping control unit respectively generate the control signal based one or more of the active power control signal and the reactive power control signal.

4. The high voltage direct current (HVDC) transmission system according to claim 1, wherein the first active power measurement unit measures an AC current and an AC voltage input to the rectifier to measure the first active power, and
the second active power measurement unit measures an AC current and an AC voltage output from the inverter to measure the second active power.

5. The high voltage direct current (HVDC) transmission system according to claim 1, wherein the second control unit receives the second active power measured by the second active power measurement unit.

6. The high voltage direct current (HVDC) transmission system according to claim 1, further comprising:
a first AC filter removing a harmonic current generated in the power conversion process of the rectifier, and
a second AC filter removing the harmonic current generated in the power conversion process of the inverter.

7. The high voltage direct current (HVDC) transmission system according to claim 1, wherein each of the rectifier and the inverter comprises any one of a thyristor value and an insulated gate bipolar transistor (IGBT) valve.

8. The high voltage direct current (HVDC) transmission system according to claim 1, further comprising:
a first capacitor connected in parallel to the rectifier and smoothing a DC voltage output from the rectifier; and
a second capacitor connected in parallel to the inverter and smoothing a DC voltage input to the inverter.

* * * * *